ns Patent Office
3,399,220
Patented Aug. 27, 1968

3,399,220
PROCESS FOR PREPARING DIORGANO-
ANTIMONY MERCAPTIDES AND CAR-
BOXYLATES
Nathaniel L. Remes, Livingston, and John J. Ventura, East Brunswick, N.J., assignors to M & T Chemicals Inc., New York, N.Y., a corporation of Delaware
No Drawing. Filed Apr. 24, 1964, Ser. No. 362,466
16 Claims. (Cl. 260—446)

ABSTRACT OF THE DISCLOSURE

In accordance with certain of its aspects, the process of this invention for preparing a compound of the formula $R_2SbZR'$ wherein R and R' are selected from the group consisting of alkyl, aryl, and alkenyl, and Z is selected from the group consisting of —S— and —OOC—, comprises mixing together $(R_2Sb)_2O$ and HZR' at a reaction site in the presence of inert hydrocarbon solvent thereby forming $R_2SbZR'$ and water; and continuously removing said water from said reaction site; said $(R_2Sb)_2O$ being present in the amount of at least one mole per two moles of HZR'.

---

This invention relates to a novel process for preparing organoantimony compounds.

Organoantimony compounds of the formula $R_2SbX$ wherein R is a hydrocarbon group and X is an anionic group such as mercaptide, carboxylate, etc., may be employed as stabilizers, bactericides, germicides, etc. Such compounds have not, however, enjoyed wide commercial use because of a lack of a convenient method for preparing them in high yield and purity. It has been shown, for example, that the diorganoantimony compounds of the formula $R_2SbX$ cannot be prepared in the same manner as the monohydrocarbonantimony compounds, $RSbX_2$. Prior attempts to prepare $R_2SbX$ from available starting materials, e.g., $(R_2Sb)_2O$ have resulted in cleavage of one of the R groups and, consequently, formation of $RSbX_2$ rather than the desired $R_2SbX$.

It is an object of this invention to provide a novel process characterized by its ability to produce high yields of high purity dihydrocarbonantimony compounds. Other objects will become apparent to those skilled in the art upon reading the following disclosure.

In accordance with certain of its aspects, the process of this invention for preparing a compound of the formula $R_2SbZR'$ wherein R and R' are selected from the group consisting of alkyl, aryl, and alkenyl, and Z is selected from the group consisting of —S— and —OOC—, comprises mixing together $(R_2Sb)_2O$ and HZR' at a reaction site in the presence of inert hydrocarbon solvent thereby forming $R_2SbZR'$ and water; and continuously removing said water from said reaction site; said $(R_2Sb)_2O$ being present in the amount of at least one mole per two moles of HZR'.

The products of this invention may be prepared from a bis(diorganostibine)oxide of the formula $(R_2Sb)_2O$ wherein R is selected from the group consisting of alkyl, aryl, and alkenyl. Typical alkyls may include methyl, ethyl, n-propyl, isopropyl, n-butyl, isobutyl, sec-butyl, tert-butyl, amyl, hexyl, octyl, decyl, dodecyl, octadecyl, cyclohexyl, cycloheptyl, etc. Typical aryls may include phenyl, naphthyl, phenanthryl, etc. Typical alkenyls may include vinyl, allyl, 1-propenyl, 1-butenyl, 2-butenyl, 3-butenyl, etc. The radical R may bear inert substitutents, i.e., it may bear a substituent which does not react with other components of the process or interfere with the reaction. Typical inert substituents may include halogen, nitro, ether, aryl, alkyl, etc. Typical inertly substituted R radicals may include chlorophenyl, nitrophenyl, benzyl, tolyl, ethylphenyl, phenylethyl, chlorobutyl, 2-ethylhexyl, ethoxyethyl, methylcyclohexyl, 4-chloro-3-butenyl, etc. Preferably R may be aryl and most preferably it may be phenyl.

Illustrative $(R_2Sb)_2O$ compounds may include
bis(diphenylstibine)oxide,
bis(dimethylstibine)oxide,
bis(diethylstibine)oxide,
bis(di-n-propylstibine)oxide,
bis(di-sec-butylstibine)oxide,
bis(dihexylstibine)oxide,
bis(dicyclohexylstibine)oxide,
bis(dibenzylstibine)oxide,
bis(dinaphthylstibine)oxide,
bis(diallylstibine)oxide,
bis(di-p-chlorophenylstibine)oxide,
bis(ditolylstibine)oxide, etc.

The bis(diarylstibine)oxides may be preferred and bis(diphenylstibine)oxide may be most preferred. The bis(diorganostibine)oxides may be readily available or may be conveniently prepared. For example, one mole of antimony trichloride may be reacted with three moles of Grignard reagent RMgCl to form $R_3Sb$. Two moles of this product may be further reacted with one mole of antimony trichloride to give $R_2SbCl$ which may be readily hydrolyzed, e.g., with aqueous ammonia or potassium hydroxide, to give $(R_2Sb)_2O$.

The bis(diorganostibine)oxide may be reacted with a compound HZR' wherein R' may be selected from the same group as R, described supra, and Z may be selected from the group consisting of —S— and —OOC—. R and R' may be the same or different. When Z is —S—, HZR' may be HSR', a mercaptan or thiol, including ethanethiol, n-propanethiol, sec-butanethiol, thiophenol, 2-propene-1-thiol, α-toluenethiol, thiocresol, cyclohexanethiol, dodecanethiol, carboethoxymethanethiol, etc. Preferably, when Z is —S—, R' may be alkyl and HZR' may be an alkanethiol.

When Z is —OOC—, HZR' may be a carboxylic acid HOOCR', including acetic acid, propionic acid, butyric acid, benzoic acid, chlorobenzoic acid, cyclohexanecarboxylic acid, lauric acid, oleic acid, acrylic acid, 2-ethylhexoic acid, α-toluic acid, p-toluic acid, chloropropionic acid, etc.

The reactants $(R_2Sb)_2O$ and HZR' may react according to the equation:

$$(R_2Sb)_2O + 2HZR' \rightarrow 2R_2SbZR' + H_2O \qquad (I)$$

When Z is —S—, Equation I may be:

$$(R_2Sb)_2O + 2HSR' \rightarrow 2R_2SbSR' + H_2O \qquad (II)$$

and when Z is —OOC—, Equation I may be:

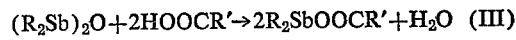
$$(R_2Sb)_2O + 2HOOCR' \rightarrow 2R_2SbOOCR' + H_2O \qquad (III)$$

In accordance with this invention, the compound $(R_2Sb)_2O$ may be employed in the amount of at least one mole per 2 moles of HZR'. Most preferably, the 2 reactants may be reacted in substantially stoichiometric quantities according to Equation I, i.e., 1 mole of $(R_2Sb)_2O$ and 2 moles of HZR'. Both reactants may be added and mixed together simultaneously, or the compound HZR' may be added incrementally during the reaction.

Reaction of the two reactants may be accomplished by mixing them together at a reaction site, preferably in the presence of an inert hydrocarbon solvent. Inert hydrocarbon solvents are those which do not react with the reactants or interfere with the desired reaction. Typical inert hydrocarbon solvents (including inertly substituted solvents) which may be employed include benzene, toluene, cyclohexane, petroleum ether, n-heptane, ligroin, xylene, carbon tetrachloride, trichloroethylene, etc. Benzene may be a preferred inert hydrocarbon solvent. The inert hydrocarbon solvent may typically be employed in the amount of about 0.5–10 liters per mole of bis(diorganostibine)oxide. Preferably, it may be employed in the amount of about 3–5, say 4 liters per mole of oxide.

In the process of this invention, the by-product water may be continuously removed from the reaction site. The water of reaction may be removed by appropriate drying means. Preferably, it may be removed by distillation in the presence of an inert hydrocarbon solvent having a boiling point at atmospheric pressure greater than 100° C. or which azeotropically distills with water at a temperature below 100° C. and typically less than about 200° C. Preferred solvents are those which give water azeotropes or which boil at temperatures of about 75–120° C.

The reaction may be carried out over a wide range of temperatures, typically 40–150° C., and preferably 75–120° C. Where the inert hydrocarbon solvent has a suitable boiling point, the reaction temperature may be maintained by refluxing. Preferably, a Dean-Stark trap or similar apparatus may be employed to separate from the distillate the water of reaction and to return to the reaction site the inert hydrocarbon solvent, together with any of the reactants which may have been volatilized.

The reaction may be continued until no more water of reaction is formed, typically about 0.3–10 hours. When no further reaction occurs, the inert hydrocarbon solvent may be stripped off, typically by means of vacuum distillation, rotary film evaporator, etc. The product $R_2SbZR'$ may be recovered as an oil or a solid, depending upon the particular R, Z, and R' groups present. If an oil, it may be filtered and then chilled to induce crystallization. If a solid, it may be washed to remove any unreacted material, leached and recrystallized. Typically, $R_2SbZR'$ may be recovered in high yield, e.g., 70–100% of theory and substantially uncontaminated by undesirable side-reaction products.

During the reaction and isolation of the products, it may be desirable to maintain an inert atmosphere, typically nitrogen or refluxing inert hydrocarbon solvent, to prevent undesirable oxidation reactions. In particular, the dialkylstibine and dialkenylstibine compounds may react readily with oxygen and may, therefore, require an inert atmosphere.

Illustrative compounds of the formula $R_2SbZR'$ which may be prepared by the process of this invention may include:

Diphenylstibine lauryl mercaptide
Di-n-butylstibine ethyl mercaptoacetate
Ditolylstibine n-amyl mercaptide
Dibenzylstibine benzyl mercaptide
Diallylstibine lauryl mercaptide
Diphenylstibine allyl mercaptide
Dicyclohexylstibine n-hexyl mercaptide
Ditolylstibine phenyl mercaptide
Diphenylstibine acetate
Di-isopropylstibine butyrate
Dibenzylstibine acrylate
Diallylstibine caprylate
Ditolylstibine benzoate
Dicyclohexylstibine p-chlorobenzoate
Diphenylstibine α-toluate Practice of specific embodiments of this invention may be observed from the following illustrative examples.

Example 1.—Diphenylstibine 2-ethylhexanoate

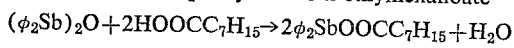

A solution of 28.8 grams (0.2 mole) of 2-ethylhexanoic acid and 56.8 grams (0.1 mole) of bis(diphenylstibine)oxide in 400 ml. of benzene was heated under reflux in a flask equipped with a Dean-Stark trap and reflux condenser. Within 30 minutes, 1.8 ml. (100%) of water had collected in the trap. After heating under reflux for 1.5 hours, the solvent was stripped, first at atmospheric pressure, then under vacuum, leaving 86 grams (100%) of an oily residue which crystallized after cooling (M.P. 44–45° C.). It was recrystallized from pentane (M.P. 48–49° C.).

*Analysis.*—Calcd. for $C_{20}H_{25}O_2Sb$: Sb, 29.05%; acid No. 134. Found: Sb, 29.12%; acid No. 134.

Example 2.—Diphenylstibine p-chlorobenzoate

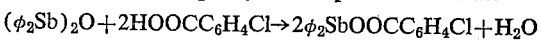

A solution of 56.8 grams (0.1 mole) of bis(diphenylstibine)oxide and 31.31 grams (0.2 mole) of p-chlorobenzoic acid in 400 ml. of benzene was heated under reflux in a flask equipped with reflux condenser and Dean-Stark trap. Within 1.5 hours, 1.8 ml. (100% yield) of water had collected in the trap. The reaction mixture was filtered hot, and then stripped of solvent at 65° C./80 mm. pressure to yield 63.4 grams (73.5%) of diphenylstibine p-chlorobenzoate. The crude material melted at 118–121° C., and had the following analysis.

Calcd. for $C_{19}H_{14}O_2ClSb$: Sb, 28.22%; acid No. 130. Found: Sb, 26.9%; acid No. 144.

It did not depress the melting point of an authentic sample of diphenylstibine p-chlorobenzoate (M.P. 122–125° C.).

Example 3.—Diphenylstibine n-amyl mercaptide

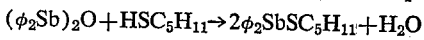

A solution of 56.8 grams (0.1 mole) of bis(diphenylstibine)oxide and 20.8 grams (0.2 mole) of pentanethiol in 400 ml. of benzene was heated under reflux in a flask equipped with Dean-Stark trap and reflux condenser. With 1.5 hours 1.8 ml. of water (100% yield) had collected in the trap. The solvent was removed at 65° C./80 mm., leaving a hazy liquid which was clarified by filtration (71.0 grams; 93.7%).

The product distilled at 218° C./0.5 mm. without apparent decomposition.

*Analysis.*—Calcd. for $C_{17}H_{21}SSB$: Sb, 32.11%; S, 8.46%. Found: Sb, 31.6%; S, 7.9%.

Example 4.—Diphenylstibine carboethoxymethyl mercaptide

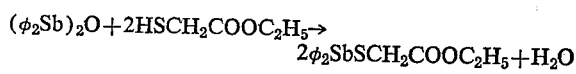

A solution of 56.8 grams (0.1 mole) of bis(diphenylstibine)oxide and 24 grams (0.2 mole) of ethyl mercaptoacetate in 400 ml. of benzene were heated under reflux in a flask equipped with Dean-Stark trap and reflux condenser. Over a period of 1 hour 1.8 ml. (100%) of water collected in the trap. The solvent was removed by distillation at 65° C./80 mm., leaving a yellow hazy oil which was clarified by filtration (78.0 grams; 98%). This distilled at 210–222° C./0.55 mm., with slight decomposition.

Calcd. for $C_{16}H_{17}SO_2Sb$: Sb, 30.82%; S, 8.11%. Found: Sb, 28.6%; S, 6.8%.

As may readily be seen from an inspection of the above-noted examples, practice of this invention gives high yields of high purity $R_2SbZR'$ and little or no loss of product through undesirable side-reactions.

Although this invention has been illustrated by reference to specific embodiments, numerous changes and modifications thereof which clearly fall within the scope of the invention will be apparent to those skilled in the art.

We claim:

1. The process for preparing a compound of the formula $R_2SbZR'$ wherein R and R' are selected from the group consisting of alkyl, aryl, and alkenyl, and Z is selected from the group consisting of —S— and —OOC—, which comprises mixing together $(R_2Sb)_2O$ and $HZR'$ at a reaction site in the presence of inert hydrocarbon solvent thereby forming $R_2SbZR'$ and water; and continuously removing said water from said reaction site; said $(R_2Sb)_2O$ being present in the amount of at least one mole per two moles of HZR'.

2. The process according to claim 1 wherein R is aryl.

3. The process according to claim 1 wherein R is phenyl.

4. The process according to claim 1 wherein said inert hydrocarbon solvent is a water-immiscible solvent having a boiling point greater than 100° C. and less than about 200° C.

5. The process according to claim 1 wherein said inert hydrocarbon solvent is a water-immiscible solvent which azeotropes with water below 100° C.

6. The process according to claim 1 wherein the reaction is carried out at 40–150° C.

7. The process according to claim 1 wherein the reaction is carried out at the reflux temperature of said inert hydrocarbon solvent.

8. The process according to claim 1 wherein said water is removed by azeotroping with said inert hydrocarbon solvent.

9. The process according to claim 1 wherein said reaction is carried out under an inert atmosphere.

10. The process for preparing a compound of the formula $R_2SbZR'$ wherein R and R' are selected from the group consisting of alkyl, aryl, and alkenyl and Z is selected from the group consisting of —S— and —OOC—, which comprises mixing together $(R_2Sb)_2O$ and HZR' in the ratio of one mole of $(R_2Sb)_2O$ to two moles of HZR' at a reaction site in the presence of inert water-immiscible hydrocarbon solvent; heating the so-formed mixture to reflux thereby forming $R_2SbZR'$ and water; and continuously removing said water from said reaction site.

11. The process according to claim 10 wherein said inert water-immiscible solvent has a boiling point greater than 100° C.

12. The process according to claim 10 wherein said inert water-immiscible solvent forms an azeotrope with water below 100° C.

13. The process according to claim 10 wherein the reflux temperature is 75–120° C.

14. The process according to claim 10 wherein R is aryl.

15. The process according to claim 10 wherein R is phenyl.

16. The process according to claim 10 wherein the reaction is carried out under an inert atmosphere.

References Cited

Kosolapoff: Chem. Abstracts (1961), vol. 55, page 19841(i).

TOBIAS E. LEVOW, *Primary Examiner.*

W. F. BELLAMY, *Assistant Examiner.*